United States Patent [19]
Walton

[11] Patent Number: 5,966,073
[45] Date of Patent: *Oct. 12, 1999

[54] AUTOMOTIVE, FRONT AND SIDE BRAKE / RUNNING/ TURN SIGNAL LIGHT

[76] Inventor: Edward B. Walton, P.O. Box 10310, Marina del Rey, Calif. 90295

[ * ] Notice: This patent is subject to a terminal disclaimer.

[21] Appl. No.: 08/968,517

[22] Filed: Nov. 12, 1997

Related U.S. Application Data

[63] Continuation-in-part of application No. 08/496,040, Jun. 28, 1995, Pat. No. 5,844,479.

[51] Int. Cl.$^6$ ........................................................ B60Q 1/44
[52] U.S. Cl. ........................... 340/479; 340/475; 340/463; 340/468
[58] Field of Search ..................................... 340/479, 475, 340/467, 463, 464, 465, 468, 469, 471, 472

[56] References Cited

U.S. PATENT DOCUMENTS

| | | | |
|---|---|---|---|
| 1,553,959 | 9/1925 | Pirkey | 340/479 |
| 1,806,276 | 5/1931 | Bailey | 340/479 |
| 2,190,123 | 2/1940 | Pace | 340/479 |
| 3,364,384 | 1/1968 | Dankert | 340/479 |
| 3,665,392 | 5/1972 | Annas | 340/479 |
| 3,875,559 | 4/1975 | Szekessy | 340/479 |
| 4,290,048 | 9/1981 | Cutlip et al. | 340/479 |
| 4,808,968 | 2/1989 | Caine | 340/479 |
| 5,111,183 | 5/1992 | Wang | 340/479 |
| 5,255,165 | 10/1993 | Cail | 362/80.1 |
| 5,258,740 | 11/1993 | Viano et al. | 340/467 |
| 5,373,426 | 12/1994 | O'Sullivan | 362/83.3 |
| 5,758,944 | 6/1998 | Jandron | 340/479 |

*Primary Examiner*—Nina Tong
*Attorney, Agent, or Firm*—Bruce A. Jagger

[57] ABSTRACT

The present invention is a vehicle with front side and/or front mounted, brake and turn signal lights. The respective front side mounted lights, when mounted on passenger vehicles, are generally mounted below the windshield, behind the front wheel and ahead of the forward edge of the front door where they are generally visible for almost 180 degrees. When so mounted the lights are below the operator's line of sight, so they do not interfere with or distract the operator. The brake lights on the rear of the vehicle are generally red, and those on the side and front of the vehicle are generally blue. When forward facing daytime running lights are provided, generally these lights are on so long as the ignition circuit is on, except when the brake lights are activated, then they are extinguished as the blue brake lights on the front side and/or front are illuminated. When turn signals of one side of the vehicle are activated so as to flash intermittently, the turn signals on the opposite side may be actuated to burn continuously. The brake lights are generally actuatable whether the ignition of the vehicle is on or not. Generally, the turn signal lights are not actuatable when the ignition circuit is off.

13 Claims, 7 Drawing Sheets

AUTOMOTIVE, FRONT AND SIDE BRAKE / RUNNING/ TURN SIGNAL LIGHT

This application is a continuation-in-part of Ser. No. 08/496,040, filed Jun. 28, 1995, now U.S. Pat. No. 5,844,479.

BACKGROUND OF THE INVENTION

The present invention relates to the field of vehicle lighting and more particularly to signal lights for road vehicles such as, for example, passenger vehicles, motorcycles, construction and maintenance vehicles, farm equipment, trucks, busses, and the like.

All vehicles which travel on public roads are provided with a variety of lights which provide visual signals to pedestrians and other drivers on the roads. Currently, vehicles have stop lights, turn lights, headlights and running lights. Stop lights are generally only provided on the rear of the vehicles and are usually colored red. They provide a visual indication, primarily from the rear, that the brakes are being applied (i.e. that the vehicle is slowing rapidly). Turn signals are provided on the front and rear and are usually yellow or amber. Turn signals usually flash and provide a visual indication from the front, rear and sides that the vehicle is turning or intending to turn. Headlights are located on the front of the vehicle and, while they are primarily intended to illuminate the roadway at night, they also provide a visual clue to the direction of travel of the vehicle. Headlights are clear or white and are usually only used at night, but may be illuminated during the day for safety purposes. Running lights are frequently provided on the front, rear and sides of vehicles, particularly trucks. Running lights are generally amber or red, depending on location. They can generally be switched on or off at will and also provide a visual clue, especially at night and from the side, of the size of the vehicle and its direction of travel.

It can be seen that one important visual signal is missing: an indication from the front and side that the vehicle is slowing. Front mounted brake signal systems have been proposed by previous workers. See, for example, Technical Memorandum HuF-TM-1, "Subjective Evaluation of the Front-Mounted Braking Signal" by D. V. Post and R. G. Mortimer of the Highway Safety Research Institute of the University of Michigan, where apparently amber colored, front windshield mounted brake lights were tested.

Expedients proposed by previous workers in this field include, for example, Pirkey U.S. Pat. No. 1,553,959, issued Sep. 15, 1925, which appears to suggest manually operated, switch controlled turn and brake signal lamps for the front and rear of a vehicle. Bailey U.S. Pat. No. 1,806,276, issued May 19, 1931, generally describes a manually operated indicator lamp box consisting of three chambers including lamps and moveable reflectors in each chamber, and translucent stencil markings at the front which appears to be meant to be attached inside the windshield. In U.S. Pat. No. 2,190,123, issued Feb. 13, 1940, Pace generally proposes a manually activated indicator lamp box intended to be mounted in a vehicle, approximately in the area of the rear view mirror, to indicate to pedestrians to the front of the vehicle that the driver is yielding the right of way to the pedestrians. In U.S. Pat. No. 3,364,384, issued Jan. 16, 1968, Dankert generally proposes a signaling system for depicting a vehicle driver's actions. The proposed system apparently consists of a specially designed light, mounted someplace on the front of the vehicle, connected to sensors within. The light provides different colored visual signals depending upon whether the vehicle is at constant speed, accelerating, or decelerating. Annas has proposed, in U.S. Pat. No. 3,665,392, issued May 23, 1972, a driver communication signal light mounted on the front windshield connected to the vehicle brakes for indicating to pedestrians and other drivers when the driver has applied his brake. None of these prior workers suggest combining the front brake light with the turn or running light of the automobile in order to provide a change in visual signal to the front and side as the brakes are being applied. These and other disadvantages of the prior art have been overcome according to the present invention.

SUMMARY OF THE INVENTION

The present invention comprises, for example, a front and forward side mounted, combination brake/running/turn signal light which will provide a visible change in signal as the vehicle brakes. The main objective of the present invention is to provide persons to the front and side of an automobile with a strong visual indication that the vehicle is braking. Additionally, means may be provided to give a further indication as to how hard it is breaking.

According to one preferred embodiment, an assembly with two light chambers is provided. The chambers are optically isolated from each other so that, for example, light from one chamber does not illuminate the other. The light in one chamber is connected to the ignition and brake circuits of the vehicle. Connection is made so that this first light lights when the vehicle is operating and goes out when the brakes are applied. The light in the other chamber is connected to the brake circuit of the vehicle. This second light is lighted, for example, whenever the brakes are applied. Varying intensity of the application of the brakes may be indicated by a proportional varying of the intensity of this light.

Thus, the assembly provides a visual signal that is white whenever the vehicle is in operation, changes from white to blue when the brakes are applied and changes from blue back to white again when the use of brakes is terminated. This assembly can be provided as a kit for retrofitting of existing vehicles or as a sub-component to be assembled into a specially provided body cavity at original manufacture. This assembly is intended to be attached to the front and forward sides of the vehicle.

In a variation of this embodiment, the first light is connected to the turn signal circuit of the vehicle. The preferred color for turn signal lights is amber. Also turn signals commonly flash. Thus, in this case the assembly will provide a blue signal when the brakes are applied and a flashing amber signal when the vehicle is turning. Again this variation can be provided as a kit or a sub-component and is intended to be attached to the front and forward sides of the vehicle.

In a second embodiment, an assembly with three light chambers is provided. The chambers are optically isolated from each other so that light from one chamber does not illuminate the other. The light, for example, in one chamber is connected to the ignition and brake circuits of the vehicle. Connection is made so that this first light lights when the vehicle is operating and goes out when the brakes are applied. The light in the second chamber is connected to the brake circuit of the vehicle. This second light is lighted whenever the brakes are applied. The light in the third chamber is connected to the turn signal circuit of the automobile which operates in the normal fashion.

Thus the assembly provides a visual signal that is white whenever the vehicle is in operation, changes from white to blue when the brakes are applied, changes from blue back to white again when the use of brakes is terminated and in addition flashes amber when the vehicle is turning. This assembly can be provided as a kit for retrofitting of existing vehicles or as a sub-component to be assembled into a specially provided body cavity at original manufacture. This assembly is intended to be attached to the front and forward sides of the vehicle.

The color of light emitted by the different chambers is engineered either by providing standard, automotive incandescent bulbs covered by different colored lenses or providing light emitting diodes which glow in different colors. As an alternate, the light sources may be provided via fiber optic cables running to a central source of illumination (see U.S. Pat. No. 5,111,183). The preferred colors are blue for the stop signal, white or clear for the running signal and amber for the turn signal.

A third embodiment employs a single electrochromic element. These elements glow with different colors depending upon whether a positive or negative voltage is applied. Electrochromic elements are typically made of tungsten trioxide. With appropriate circuitry attached to the brake and ignition circuits of the vehicle, the element could be made to glow white whenever the vehicle is in operation; to change from white to blue whenever the brakes are applied; and to change from blue back to white whenever the brakes are disengaged. In a variation of this embodiment, the electrochromic element can be combined with a turn signal lamp in a single assembly. Thus a flashing amber turn signal can also be supplied.

Another variation can be made with any of the above embodiments. In this variation, for example, a pair of the above embodiments are mounted on the front of the vehicle close to the sides and a monochromatic light is attached generally in the front and center of the vehicle. This monochromatic light is only attached to the brake circuit of the vehicle and preferably provides a blue light. Thus this monochromatic, front and center mounted light reinforces the front braking signal provided by the side mounted assemblies.

Retrofitting of existing vehicles may be accomplished, for example, by building the light system of this invention into a bumper and replacing the front bumper of the vehicle with the light containing bumper. Alternatively retrofitting may be accomplished by mounting individual fixtures about the front and forward sides of the vehicle in whatever locations are most visible for a particular vehicle.

Most passenger vehicles and trucks are generally configured so that they include a generally forward facing windshield, and left and right sides which are generally symmetrical around a plane which includes the longitudinal axis of the vehicle and extends generally normal to the horizon. See, for example, FIGS. 5 and 7 hereto. Each side of the vehicle generally includes a front wheel, a door opening, and a front side panel which extends below the windshield between the normally forward edge of the door and the front wheel. This panel, which is generally mirrored on the opposite side of the vehicle, provides a convenient place to mount side mounted brake and turn signals. They are below the line of vision of the vehicle operator so they do not cause the operator any loss of view or distraction. At this front side location such lights are prominently visible for approximately 180 degrees to individuals on either side of the vehicle, but they do not distract or in any way hinder the driver. Brake and turn lights can also be mounted on the front of the vehicle, preferably on the front corners below the line of sight of the vehicle operator. Some vehicles, such as, for example, cab forward trucks, have the front wheels directly under, or even to the rear of the door. In such vehicles there is generally a front side panel below the line of vision of the operator, rearward of the front wheel and the front door, and forward of the cargo containing portion of the vehicle. The expression "front side location" is intended to include the location of signal lights which are positioned on such a front side panel of a cab. Elongated trucks generally have rear sides on the cargo containing portion of the vehicle which extend generally rearwardly of and from approximately adjacent the front side locations to the rear of the truck. The expression "front side location" is not intended to include such rear sides. Such rear sides are conveniently referred to as "rear sides".

In general, powered vehicles which are permitted to travel on the public roadways are provided with at least a braking system, and activatable brake light, turning signal and ignition circuits. These are cooperatively interconnected so that, for example, activating the braking system also activates the brake light circuit. Also, preferably, the turning signal circuit, and associated turning signals, generally can not be activated unless the ignition circuit is on. Daytime running light circuits, and associated daytime running lights, can also be provided. Daytime running light circuits can be operatively interconnected with the other circuits so that, for example, the frontwardly facing daytime running lights are on at all times when the ignition circuit is on except that they are extinguished when the brake light circuit is activated.

In general, at least one brake light emitting member having a red hue is mounted on the rear of the powered vehicle and activated by the braking circuit. The interconnection between the braking system and the brake light circuit is such that this red light is on whenever the brake system is activated, whether the ignition circuit is on or not. The brake circuit also activates brake light emitting members which are mounted on at least one of the front or front side locations of the vehicle. These brake light emitting members have a second hue which is distinctly different from the red hued rear brake lights. These brake lights can, for example, be blue.

Preferably, a turn light emitting member is also mounted on the front side location with the brake light emitting member. A turn light emitting member is also generally located at the front corners of the vehicle. The light emitted from the turn light emitting member is generally of a third hue which is different from that emitted by the respective rear and front or side mounted brake light emitting members. Generally, the light emitted from the turn light emitting member is amber to yellow. The turn light emitting members are operatively connected to the turn light circuit so that they are actuatable at the control of the operator to indicate the operator's intention to turn either left or right. The turn signals are not actuated when the operator intends to continue forward in a straight line. The turn signal circuit generally causes the turn light emitting member to blink so as to emit a light intermittently. If desired, the turn light circuit can be configured with the turning of the vehicle so that the turn light circuit activates the turn signals when the vehicle enters a turn and continues in that turn for some predetermined period of time, such as, for example, two seconds. In general, the turn signal light emitting members emit a blinking light on the side of the vehicle toward which a turn is intended. In addition, the turn light emitting circuit may also, for example, be configured to cause the turn light emitting members on the opposite side of the vehicle from the turn to emit a steady burning light while the opposing turn lights are blinking. As described elsewhere herein the turn and brake light emitting members can be combined into a single light source with a plurality of chambers or light emitting portions on a single base. The sources of the lights can, if desired, be physically separate from one another on different bases and still be considered to be a single light source for purposes of description and definition.

Large transportation vehicles, such as, for example, large articulated trucks, generally have clearance lights on their rear sides. Such clearance lights can be augmented or even replaced by rear side mounted brake and turn light emitting members according to the present invention.

The safety of vehicle operation is considerably improved by the application of the principals of the present invention. A visual forewarning is provided to pedestrians and operators of other vehicles as to a drivers intentions as soon as action to implement those intentions is initiated.

An appreciation of the other aims and objectives of the present invention and a more complete and comprehensive understanding of it may be achieved by referring to the accompanying drawings and studying the following description of a preferred embodiment.

DETAILED DESCRIPTION OF THE PREFERRED EMBODIMENT

The following description of the specific and preferred embodiments which have been selected is provided for purposes of illustration only and not limitation.

Figures 1, 2, 3:
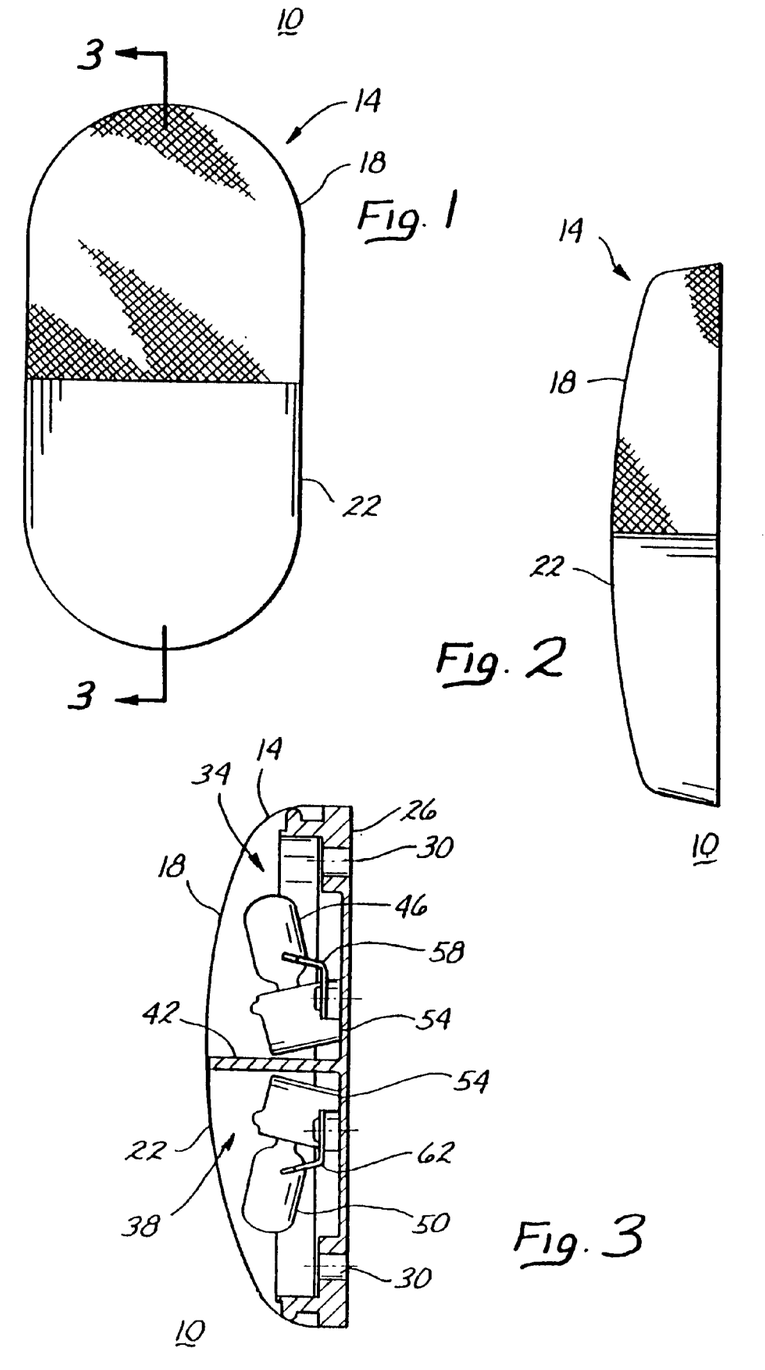
FIG. 1 is a top view of the two-lamp, turn/stop light embodiment of this invention.
FIG. 2 is a side view of the two-lamp, turn/stop light embodiment of this invention.
FIG. 3 is a cross-sectional view of the two-lamp, stop/turn light embodiment of the invention along the lines shown in FIG. 1.

FIG. 1 shows a top view of the two-lamp, turn/stop light embodiment of this invention generally at 10. It can be seen that the lens 14 has a blue section 18 and an amber section 22. The lens 14 is manufactured in accordance with the well known art of manufacturing automotive lenses.

FIG. 2 is a side view of the two-lamp, turn/stop light embodiment of this invention 10 again showing that the lens 14 is divided into a blue 18 and amber 22 section.

FIG. 3 is a cross-sectional view of the two-lamp, stop/turn light embodiment of the invention 10 along the lines shown in FIG. 1. The invention 10 has a base 26 with several mounting holes 30 for attachment to the body of a vehicle. The base is divided into two chambers 34, 38 by a separator 42. Inside the first chamber 34 is a bulb 46 inserted into a lamp holder 54 attached to the base 26. An electrical connection 58 connects this bulb 46 to the brake circuit of the vehicle. Inside the second chamber 38 is a bulb 50 inserted into a lamp holder 54 attached to the base 26. An electrical connection 62 connects this bulb 50 to the turn signal circuit of the vehicle. The lamps 46, 50 and holders 54 are standard automotive components. The invention 10 can be fabricated as a kit for retrofitting an existing automobile or as a sub-component for assembly into a specially designed body cavity as the automobile is being assembled at the factory.

In operation, the embodiment 10 shown in FIG. 3 provides a blue visual signal whenever the brakes are applied and a flashing amber signal when the vehicle is turning.

In an alternate of this embodiment the lens 22 is clear or white and the light 50 in the second chamber is connected to the ignition and brake circuits so that the lamp 50 is lit when the vehicle is operational and goes out when the brakes are applied. Thus the alternate embodiment provides a visual signal that is white whenever the vehicle is in operation, changes from white to blue when the brakes are applied, and changes from blue back to white again when the use of brakes is terminated.

In variations on these embodiments, illumination can be provided by a fiber optic cable (FOC) conducting light from a central source or by light emitting diodes (LEDs). If light emitting diodes are used, a multicolored lens 14 may be unnecessary.

Figure 4:
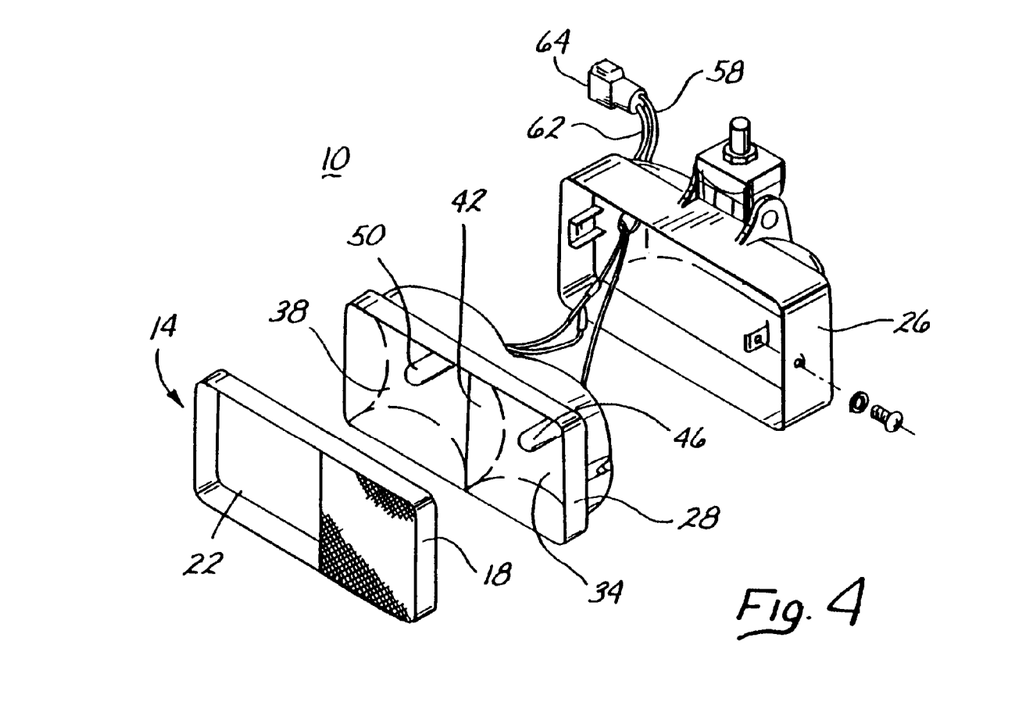
FIG. 4 is an exploded view of a two-lamp, stop/turn light embodiment.

FIG. 4 is an exploded view of a two-lamp, stop/turn light embodiment 10. FIG. 4 illustrates features that were not amenable of illustration on FIGS. 1, 2 and 3. FIG. 4 additionally shows a reflector 28 which is fastened into the base 26. Also shown are the wires 58, 62 which connect to the lamps 46, 50 and the connector 64 for connection to the internal circuitry of the automobile.

Figure 5:
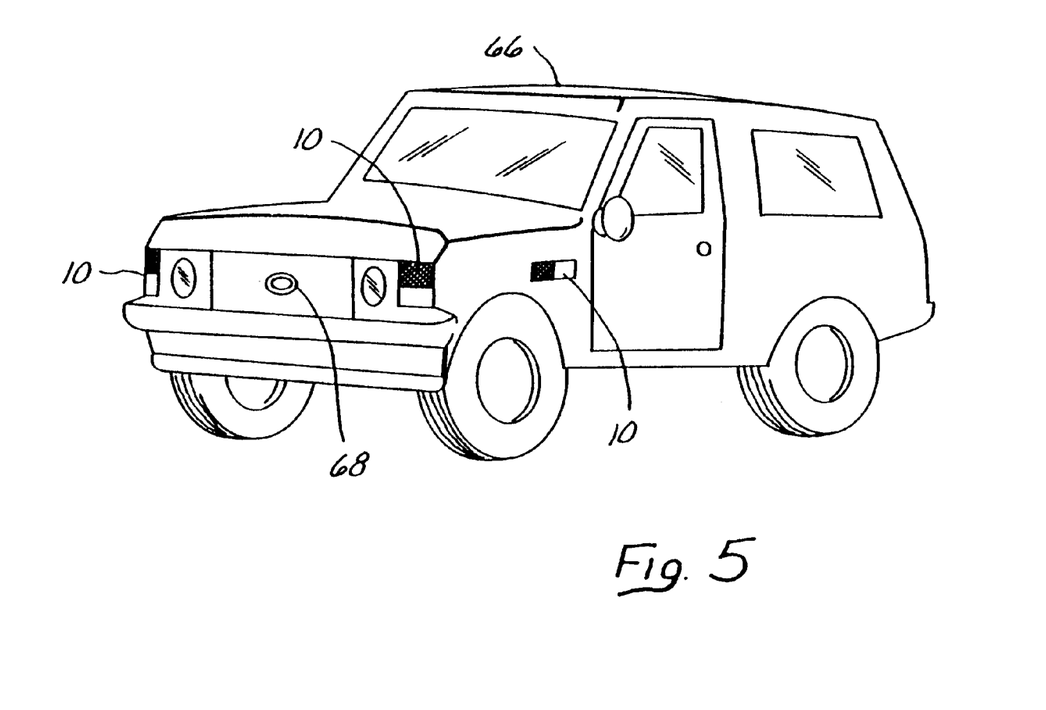
FIG. 5 shows how two-lamp embodiments of this invention can be mounted on an automobile.

FIG. 5 shows how two-lamp embodiments of this invention 10 can be mounted on an automobile 66. Preferred locations are the front corners and sides. In a variation of this embodiment, a monochromatic brake light 68 can be mounted in the front center of the automobile 66. In fact, this monochromatic light 68 can be incorporated into the vehicle logo. Thus, strong visual signals can be seen from the front and sides of the vehicle.

Figure 6:
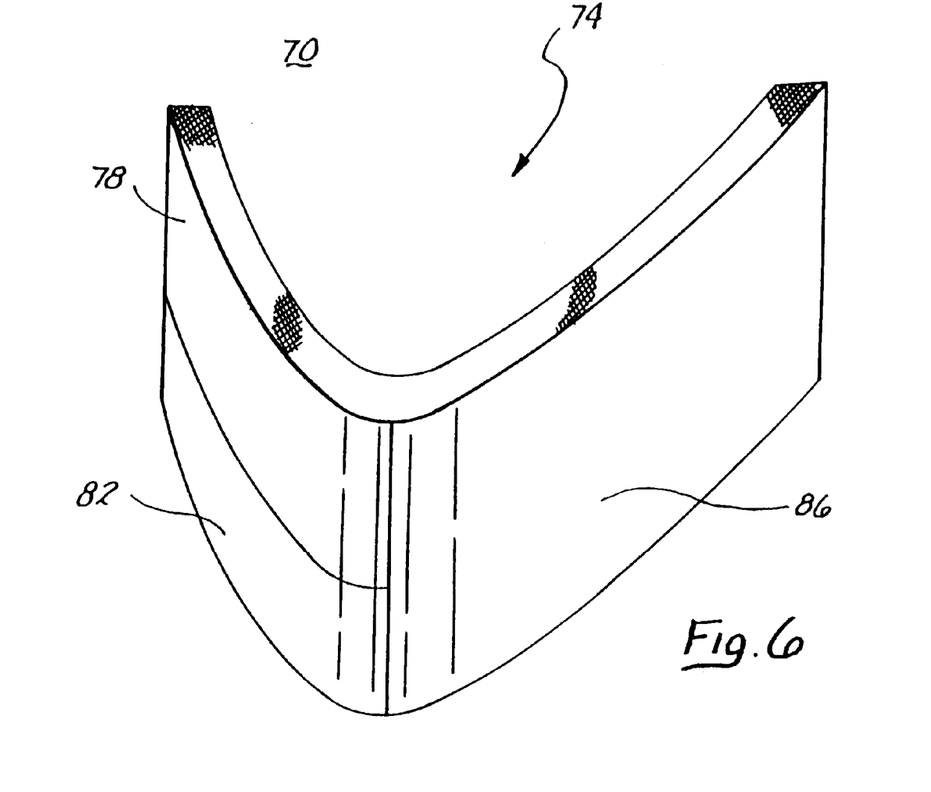
FIG. 6 is a perspective view of a three lamp, wrap-around embodiment of this invention.
Figure 12:
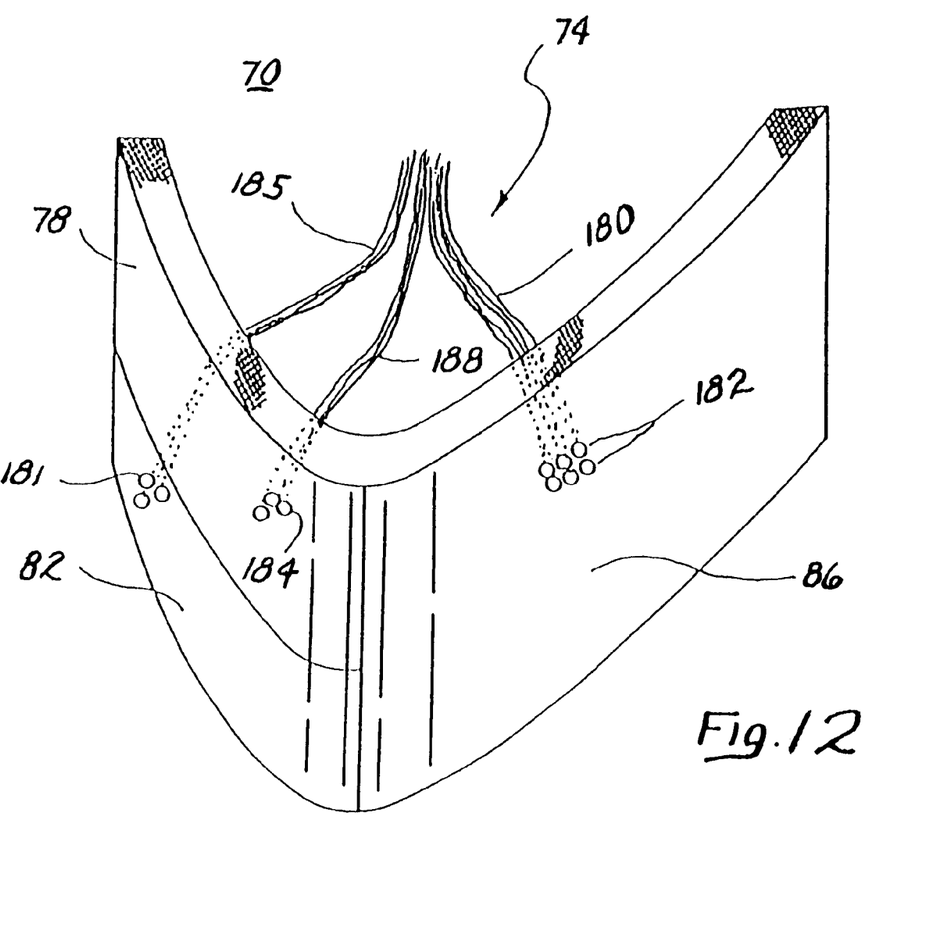
FIG. 12 is a view of the embodiment of FIG. 6 showing fiber optic illumination of the three lenses.

FIG. 6 shows a perspective view of the second embodiment 70 of this invention which has three lamps. The integral lens 74 of this three-lamp version has blue 78, clear 82 and amber 86 sections. These are intended to provide stop, running and turn signals respectively. The interior of the three-lamp version is entirely analogous to the interior of the two-lamp version. See FIG. 3. The three-lamp embodiment can be provided as a retrofit kit or subassembly. Also, various light sources can be used such as incandescent bulbs, LEDs or FOC. FIG. 12 illustrates the illumination of the three sections by fiber optic cables. The terminal ends 181 of a bundle of fiber optic cables 185 serve to illuminate clear section 82. The terminal ends 184 of a bundle of fiber optic cables 188 serve to illuminate the blue section 78, and the terminal ends 182 of fiber optic cable bundle 180 serve to illuminate amber section 186. As is conventional, sufficient terminal ends will be provided to illuminate as much of the respective sections as is desired to be illuminated. See above for more detailed description.

Figure 7:
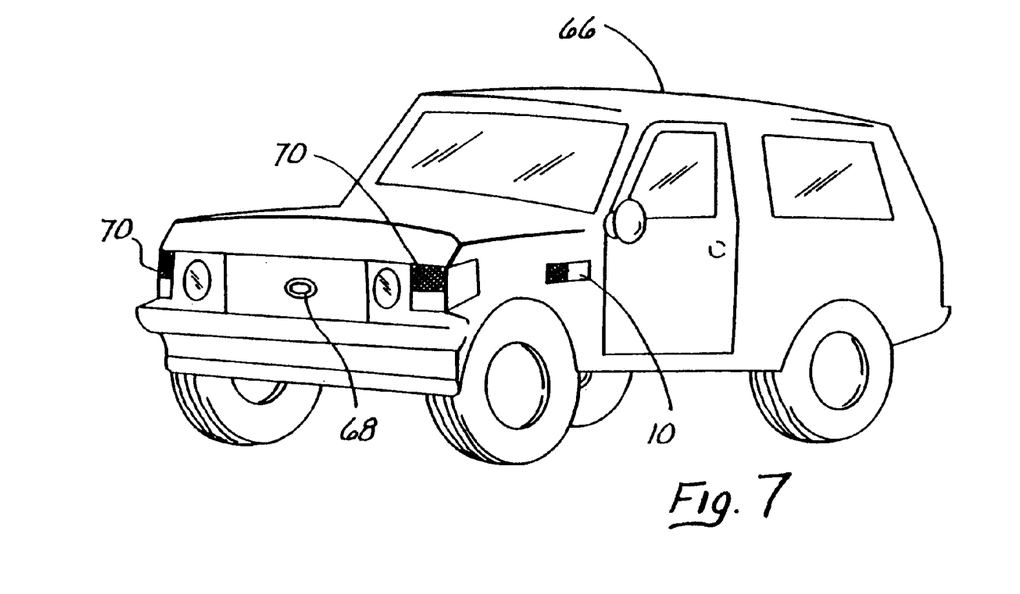
FIG. 7 shows how three-lamp embodiments of this invention can be mounted on an automobile.

FIG. 7 shows how the three-lamp embodiment 70 can be mounted on the front corners of the automobile 66. In this embodiment too a monochromatic brake light 68 can be mounted in the front center of the automobile 66. The vehicle signaling light assemblies may be mounted on opposite front sides of the vehicle.

Figure 8:
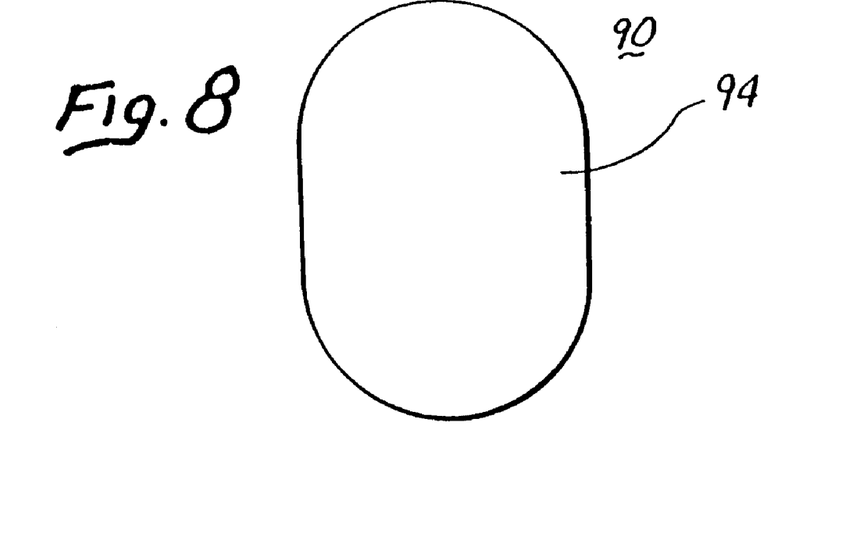
FIG. 8 is a top view of the electrochromic element version of this invention.

FIG. 8 shows the third embodiment of this invention 90 which employs a single electrochromic element 94. Electrochromic elements composed, for example, of tungsten trioxide, glow with different colors depending upon whether a positive or negative voltage is applied. With appropriate circuitry attached to the brake and ignition circuits of the vehicle, the element 94 will glow white whenever the vehicle is in operation; will change from white to blue whenever the brakes are applied; and will change from blue back to white whenever the brakes are disengaged.

Figure 9:
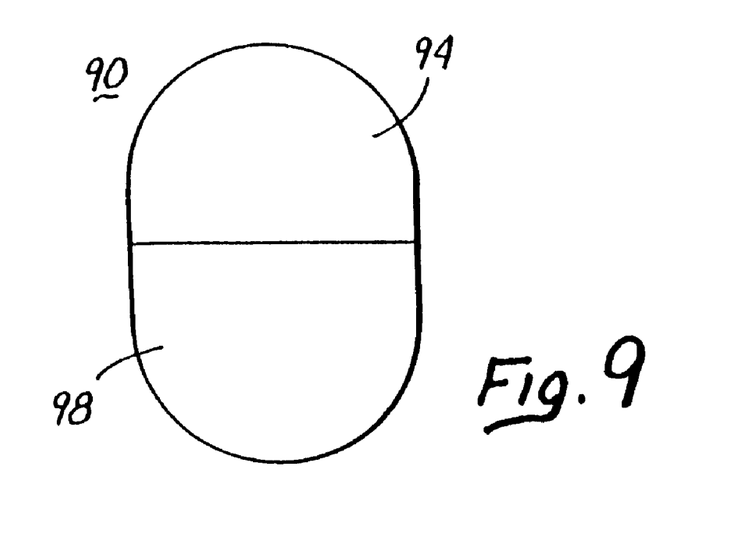
FIG. 9 shows the electrochromic version of this invention combined with a regular turn signal lamp.

FIG. 9 shows a variation of this embodiment 90. In this variation the electrochromic element 94 is combined with a turn signal lamp 98 in a single assembly. Thus a flashing amber turn signal can also be supplied. The turn signal lamp 98 can be constructed in one of the ways already described. See FIG. 3 and descriptions above.

This embodiment 90, too, can be provided as a kit for retrofitting existing automobiles or as a subassembly for original manufacture.

Figure 10:
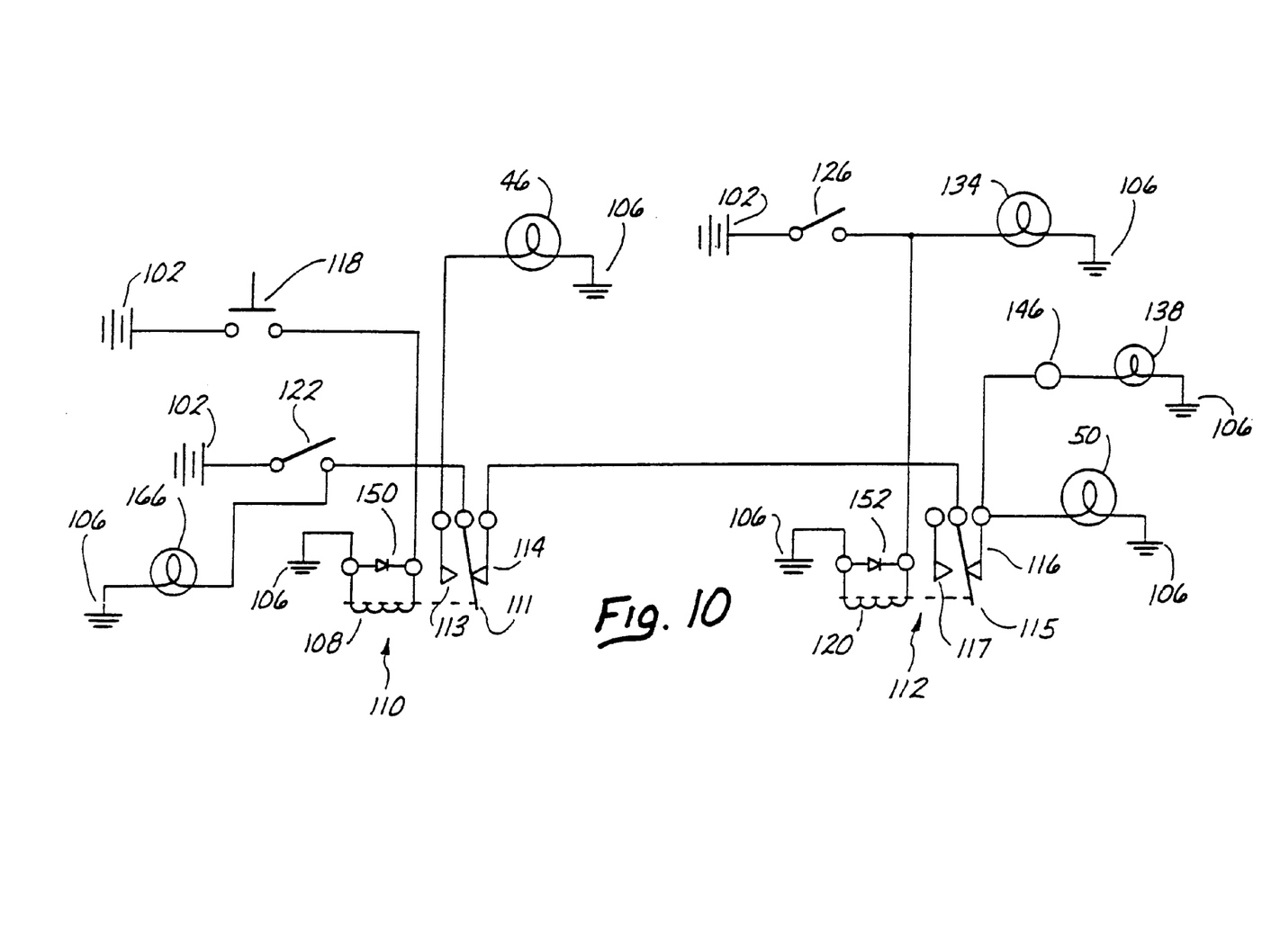
FIG. 10 shows a typical circuit diagram for electrical connection of this invention to the ignition and brake circuits of the vehicle.

FIG. 10 shows a typical circuit diagram for electrical connection of a two-lamp, stop/running light embodiment of this invention 10 to the ignition and brake circuits of the vehicle 66. The vehicle power 102 is connected through a brake switch 118 to the coil 108 of a first relay 110 and then to ground 106. This coil 108 is fitted with a diode 150 to prevent surges. Vehicle power 102 is connected through the headlight switch 126 to the headlights 134 and then to ground 106. A circuit parallel to the headlight circuit goes to the coil 120 of a second relay 112 and then to ground 106. This coil 120 is fitted with a diode 152 to prevent surges. Vehicle power is connected via the ignition switch 122 to the armature 111 of the first relay 110. The armature 111 of the first relay 110 is connected to the tail and marker lights 166 and then to ground 106. One contact 113 of this relay 110 is connected to the brake light 46 of this invention 10 and then to ground 106. The second contact 114 of this relay 110 is connected to the armature 115 of the second relay 112. One contact 116 of this relay 112 is connected to a dimmer 146 and indicator light 138, and then to ground 106. A parallel circuit connected to this contact 116 goes to the daytime running light 50 of this invention 10 and then to ground. In FIG. 10, both relays 110, 112 are show in their normal, un-energized states, i.e. no power to their coils 108, 120.

In the circuit shown in FIG. 10, after the ignition switch 122 is closed, power will flow through both relays 110, 112 and the daytime running light 50 will initially be energized. When the brake switch 118 is closed, the coil 108 in the first relay 110 will be energized, flipping the armature 111 from the first contact 114 to the second contact 113. This will switch power from the daytime running light 50 to the brake light 46.

When the headlight switch 126 is closed, in addition to powering the headlights 134, coil 120 of the second relay 112 will be energized thus swinging the armature 115 from the first contact 116 to the second contact 117. This interrupts the power supply to the daytime running light 50.

An additional feature shown on FIG. 10 is an indicator light 130 and dimmer 146. This circuit is connected in parallel to the daytime running light 50. In consequence, whenever the running light 50 is on, the indicator 138 will also light. The indicator light is mounted on the dashboard to indicate to the driver that the daytime running light 50 is operating properly. The dimmer 146, mounted close to the indicator 138 is provided for adjusting the intensity of the indicator light 138.

Figure 11:
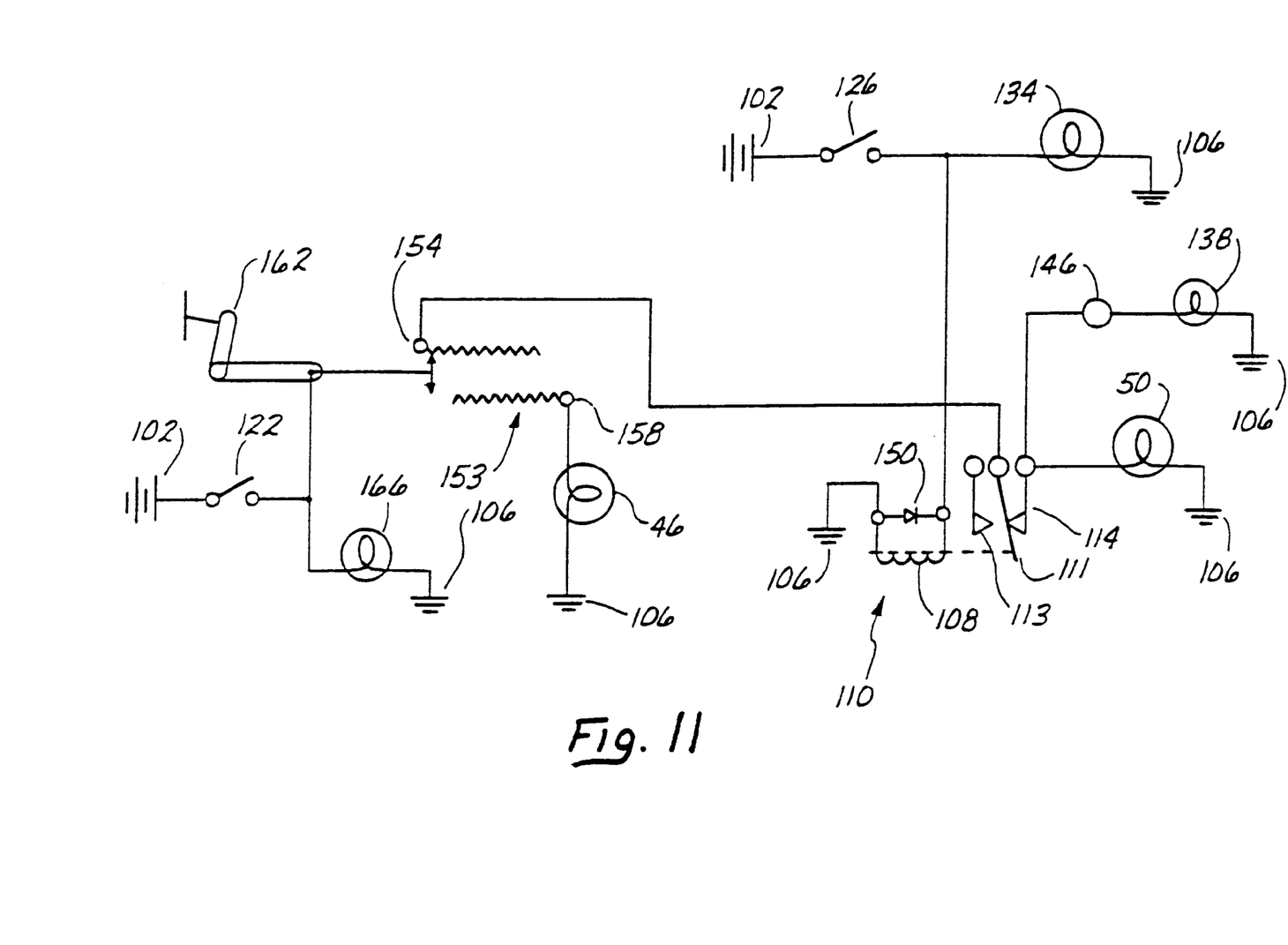
FIG. 11 shows a modification of the circuit to include variation in intensity of the lamps with variation in braking force.

FIG. 11 shows a circuit which includes the ability to vary the intensity of the lamps 46, 50 with variation in braking force. The vehicle power 102 is connected through the ignition switch 122 to two branches. On branch goes to the tail and marker lights 166 and then to ground. The second branch goes to a double rheostat 153 which is connected to and activated by the brake hydraulic system 162. The double rheostat comprises two rheostats 154, 158 coupled to each other in inverse directions: i.e. as one increases voltage, the other decreases and vice-versa. One rheostat 158 is connected to the brake light 46 of this invention 10 and then to ground 106. The other rheostat is connected to the armature 111 of a relay 110. One contact 114 of this relay 110 is connected to a dimmer 146 and indicator light 138, and then to ground 106. A parallel circuit connected to this contact 114 goes to the daytime running light 50 of this invention 10 and then to ground 106. Vehicle power 102 is connected through the headlight switch 126 to the headlights 134 and then to ground. A circuit parallel to the headlight circuit goes to the coil 108 of the relay 110 and then to ground 106. This coil 108 is fitted with a diode 150 to prevent surges. In FIG. 11, the relay 110 is shown in its normal, un-energized state, i.e. no power to the coil 108. Also in FIG. 11 the double rheostat 153 is shown in the normal position, i.e. when no braking force has been applied. In this position rheostat 154 is in the full on position and rheostat 158 is in the full off position.

In the circuit shown in FIG. 11, after the ignition switch 122 is closed, power will flow through the rheostat 154 and the relay 110 and the daytime running light 50 will initially be energized with full intensity. When the brakes are partially applied, the rheostat 153 will be moved. This will move rheostat 154 to a less than full on position and rheostat 158 to a more than full off position. In consequence, the brake light 46 will start to glow with some intensity and the daytime running light 50 will lessen in intensity. When the brakes are fully applied, rheostat 154 will come to a full off position and rheostat 158 will come to a full on position. As a consequence the brake light 46 will glow with maximum intensity and the daytime running light 50 will be extinguished.

When the headlight switch 126 is closed, in addition to powering the headlights 134, coil 108 of the relay 110 will be energized thus swinging the armature 111 from the first contact 114 to the second contact 113. This interrupts the power supply to the daytime running light 50.

The circuit shown on FIG. 11 has the additional indicator light 130 and dimmer 146 which was fully described above. FIGS. 10 and 11 illustrate several different ways in which this invention 10 can be connected to the brake and ignition circuits of an automobile 66. It should be obvious to those skilled in the art to which this invention pertains that other, similar connecting circuits can be designed. Indeed, circuits based on microprocessors can easily be designed.

Several preferred embodiments 10, 70, 90 of the automotive front and side brake and turn signal light have been described for purposes of illustration. However, as will be understood by those skilled in the art to which this invention pertains that other modifications and enhancements, reversals and substitutions, and the like, can be made without departing from the spirit and scope of the claims that follow.

What is claimed is:

1. A powered vehicle including a front end, a rear end, a first side and a second side, a first front wheel on said first side, a second front wheel on said second side, a forward facing windshield, at least said first side including a front door having a forward edge located rearward of said front wheels and generally below said forward facing windshield, a braking system, and activatable brake, turning and ignition circuits, said powered vehicle comprising:

at least one rear brake light member mounted on said rear end, said rear brake light member being operatively coupled to said braking system through said brake circuit, and adapted to being illuminated responsive to the activation of said braking system, said rear brake light member emitting light having a generally red hue;

a first light source mounted below the level of said forward facing windshield on said first side between said first front wheel and said forward edge, and a second light source mounted on said second side generally symmetrically opposite said first light source, each of said light sources including a turn light emitting member and a side brake light emitting member, said turn light emitting member being of a generally yellow or amber hue and said side brake light emitting member being of a generally blue hue, said turn light emitting members being operatively coupled to said turning circuit, said turning circuit being adapted to deactivate both turn light emitting members simultaneously or to intermittently activate one of said turn light emitting members while steadily activating the other of said turn light emitting members, said side brake light emitting members being operatively coupled to said brake circuit, said brake circuit being adapted to activate said side brake light emitting members so long as said braking system is activated, said side brake and turn light emitting members being inoperative when said ignition circuit is not activated, and operative when said ignition circuit is activated.

2. A vehicle including a front end, a rear end, a first side and a second side, a first front side location on said first side, a second front side location on said second side, a forward facing windshield, said vehicle including a braking system, and activatable brake, turning and ignition circuits, said vehicle comprising:

at least one rear brake light emitting member mounted on said rear end, said rear brake light emitting member being operatively coupled to said braking system through said brake circuit and adapted to being illuminated responsive to the activation of said braking system, said rear brake light emitting member emitting light having a first hue;

a first light source mounted at said first front side location, and a second light source mounted on said second front side location generally symmetrically opposite said first light source, each of said first and second light sources including a turn light emitting member and a side brake light emitting member, said turn light emitting member being of a second hue and said side brake light emitting member being of a third hue, said first and third hues being different, said turn light emitting members being operatively coupled to said turning circuit, said turning circuit being adapted to intermittently activate one of said turn light emitting members at a time, said side brake light emitting members being operatively coupled to said brake circuit, said brake circuit being adapted to activate said side brake light emitting members at least when said braking system and ignition circuits are activated; and a third light source mounted to said front end, said third light source including a first front brake light emitting member, said first front brake light emitting member generally emitting said third hue, said first front brake light emitting member being operatively coupled to said brake circuit, and said brake circuit being adapted to activate said first front brake light emitting member when said side brake light emitting members are activated.

3. A vehicle of claim 2 wherein said turning circuit is adapted to steadily illuminate the other of said turn light emitting members while said one turn light emitting member is intermittently activated.

4. A vehicle of claim 2 wherein said first hue is generally red, said second hue is generally amber or yellow, and said third hue is generally blue.

5. A vehicle of claim 2 wherein all said light emitting members comprise light emitting diodes.

6. A vehicle of claim 2 including forward visible daylight running lights which are operatively connected to said circuits so as to be on whenever said ignition circuit is on except when said first front brake light emitting member is activated.

7. A vehicle of claim 2 including a second front brake light emitting member mounted to said front end and being coupled to said brake circuit and operable with said first front brake light emitting member.

8. A vehicle of claim 2 wherein all said light emitting members comprise fiber optic cables.

9. A vehicle of claim 2 wherein said light sources comprise multi-chambered members mounted on a single base.

10. A vehicle of claim 9 wherein said light sources comprise two chambers.

11. A vehicle of claim 9 wherein said light sources comprise three chambers.

12. A vehicle of claim 2 wherein said light sources each comprise a base member including a turn light chamber and a stop light chamber, said respective chambers being adapted to emit light of different hues, said chambers being substantially optically isolated from each other.

13. A vehicle of claim 2 wherein each of said light sources comprise a first lens element having said second hue and being associated with said turn light emitting member, and a second lens element having said third hue and being associated with said side brake light emitting member.

* * * * *